United States Patent [19]

Deville

[11] Patent Number: 5,537,571
[45] Date of Patent: Jul. 16, 1996

[54] CONTROL DEVICE FOR A BUFFER MEMORY WITH RECONFIGURABLE PARTITIONING

[75] Inventor: Yannick Deville, La Queue en Brie, France

[73] Assignee: U.S. Philips Corporation, New York, N.Y.

[21] Appl. No.: 383,545

[22] Filed: Feb. 3, 1995

Related U.S. Application Data

[63] Continuation of Ser. No. 183,449, Jan. 18, 1994, abandoned, which is a continuation of Ser. No. 727,754, Jul. 9, 1991, abandoned.

[30] Foreign Application Priority Data

Jul. 10, 1990 [FR] France ................................ 90 08746

[51] Int. Cl.$^6$ ........................................... G06F 12/12
[52] U.S. Cl. ........................... 395/460; 395/452; 395/456; 395/463; 395/485; 395/487; 395/497.04
[58] Field of Search ........................ 364/200 MS File, 364/900 MS File; 395/400 MS, 425 MS, 452, 460, 463, 456, 486, 487

[56] References Cited

U.S. PATENT DOCUMENTS

| | | | |
|---|---|---|---|
| 4,502,110 | 2/1985 | Saito | 395/425 |
| 4,607,331 | 8/1986 | Goodrich et al. | 395/425 |
| 4,719,568 | 1/1988 | Carrubba et al. | 395/425 |
| 4,905,141 | 2/1990 | Brenza | 395/425 |
| 4,980,816 | 12/1990 | Fukuzawa et al. | 395/400 |
| 4,985,829 | 1/1991 | Thatte et al. | 395/425 |
| 5,014,195 | 5/1991 | Farrell et al. | 364/200 |
| 5,029,070 | 7/1991 | McCarthy et al. | 395/400 |
| 5,062,055 | 10/1991 | Chinnaswamy et al. | 364/200 |
| 5,109,496 | 4/1992 | Beausoleil et al. | 395/400 |
| 5,247,653 | 9/1993 | Hung | 395/425 |
| 5,257,360 | 10/1993 | Schnizlein et al. | 395/425 |

FOREIGN PATENT DOCUMENTS 75714  11/1988  European Pat. Off. ........ G06F 12/08

OTHER PUBLICATIONS

Giraud et al., "Computer Cache System With Priority Retention of Data Over Instructions", IBM Technical Disclosure Bulletin, vol. 27, No. 4B, Sep. 1984, pp. 2683–2684.
Favre et al., "Fast Memory Organization", IBM Technical Disclosure Bulletin, vol. 21, No. 2, Jul. 1978, pp. 64–65.
Smith, "Cache Memories", Computing Surveys, vol. 14, No. 3, Sep. 1982, pp. 474–530.

Primary Examiner—Reba I. Elmore
Attorney, Agent, or Firm—Anne E. Barschall

[57] ABSTRACT

Control device for a buffer memory which distinguishes information of the "instruction" type and information of the "data" type, and which replaces stored information with current information according to at least replacement algorithm. It comprises partitioning means (30) which make available, for at least one of the said types of information therefore called a limited type, a limited amount of memory, delocalized in the buffer memory, and, when a current information item has to be loaded while the said limited amount has been overloaded by the stored information of limited type, replacement means (40) load it by priority by replacing a stored replaceable information item of limited type. The value of the said limited amount can be updated. The partitioning means (30) and the replacement means (40) can be programmed means.

10 Claims, 4 Drawing Sheets

CONTROL DEVICE FOR A BUFFER MEMORY WITH RECONFIGURABLE PARTITIONING

This is a continuation of application Ser. No. 08/183,449, filed Jan. 18, 1994 which is a continuation of Ser. No. 07/727,754 filed Jul. 9, 1991 both abandoned.

FIELD OF THE INVENTION

The invention relates to a control device for a buffer memory provided with reconfigurable partitioning circuit which distinguish information of the "instruction" type and information of the "data" type, and replacement circuit for replacing stored information with current information according to at least one replacement algorithm.

BACKGROUND OF THE INVENTION

Replacement methods apply particularly to data processing systems comprising a hierarchized memory and/or a virtual memory, that are presently in use in most computers. They allow the control of paged memory (central memory), cache memory, and address translators (Translation Look-aside Buffers TLB) of such computers.

A hierarchized memory system comprises a processor and a large capacity background store. In view of the latter's inherently low speed it is necessary to interpose one or more intermediate memory levels between the processor and the background memory. Generally, the closer the memory level in question is to the processor, the faster its operating speed but the lower its storage capacity. Because of this, each memory level contains only a part of the information which is contained by the level which immediately follows it on the mass memory side. Therefore, if the processor supplies an address that is not present in a particular memory level, the memory management system must search for the information in an upstream level and load it into the level originally addressed. If, however, the latter level is full, the memory management system according to a predefined replacement algorithm must delete the information present in one of the memory elements to allocate its space to the new information. Generally, the information that is most useful to the processor must be stored as closely as possible thereto, because fetching information that is further away is a time-consuming operation.

A similar replacement problem arises in virtual memory systems. In order to avoid translating the virtual page number into a physical page number at each access, a few "virtual page, physical page" pairs which have been used are retained in a small buffer register called an address translator (Translation Look-aside Buffers TLB). When a new page is addressed, it is necessary to choose a pair to be deleted from the address translator.

Various replacement algorithms have been proposed, see "Cache memories, A. J. Smith, Computing Surveys, Vol. 14, No. 3, 1982".

The three most characteristic algorithms are:

LRU (Least Recently Used): this algorithm replaces the element which has remained unused for the longest time.

FIFO (First In First out): this algorithm replaces the element which has been present for the longest time.

Random: this algorithm replaces an element at random.

Comparing the algorithms with each other by determining a failure rate, i.e. the rate of addresses called by the processor which are not found in the memory level in question has proven that in most cases the LRU algorithm gives the best performance.

Generally, a buffer memory contains both instructions and numerical data. The term "information" will here be used to denote indiscriminately two types of information, that is either "instruction" or "data". The content of the buffer memory, as expressed in the fractional attribution of its capacity to data versus instruction, changes in the course of time according to the replacement algorithm which takes account of the addresses presented on the input, but does not generally take account of the type of information used. Because of this, optimum performance is not obtained and the percentage of accesses to the memory resulting in a miss is rather high. This result can be explained as follows: many programs in execution, result in most accesses to the memory by the processor relating to instructions, while few of them relate to data. In such case, the data contained in the memory is too often replaced by instructions and when it is subsequently desired to use the data again they have been deleted from the memory which leads to a miss. Conversely, for certain other programs, the miss rate may be high because the memory contains much data and only few instructions.

A method for managing information in a buffer memory which distinguishes between instructions and data has been proposed in the article "Fast memory organization", P. Favre and R. Kuhne, IBM Technical Disclosure Bulletin, Vol. 21, No. 2, 1978. It consists in using a buffer memory formed from modules, some of them being allocated to instructions and the others to data with the aid of two informations buses. A module control unit determines this allocation.

But such a management method has disadvantages. In effect, in a given configuration, each section of buffer memory allocated to instructions and to data, respectively, has a fixed capacity, and each module can only receive the type of information allocated to it. Now the percentages of accesses to instructions and to data may vary greatly according to the program executed. Because of this, for most programs, the capacities allocated to the two sections are poorly adapted, which results in a miss rate which is even higher than with a single buffer memory.

In consequence, when the allocation of such a buffer memory must be changed, it is necessary to save the total information of each modified module. The duration of such operations constitutes a non-negligible drawback of this type of structure. It may be also necessary to reconfigure the routing gates. If these are many, this operation delays functioning of the buffer memory. The buffer memory according to this prior art operates by separating instructions from data but does not allow organizing the memory elements according to several classes, each class being referenced by a tag, in order to reduce the number of comparators necessary for the referencing of the stored information. The buffer memory of the prior art is thus oriented for operating in associative mode and not for an operating mode based on classes.

Furthermore, the separation of the buffer memory into two blocks with predetermined allocation gives rise to problems of coherence between the contents of the two blocks. In effect, each element of a buffer memory will contain a group of words having successive addresses. In practice, however, such a group is often found to contain both instructions and data. This means that a particular group of words may be loaded twice, first, when calling for an instruction that is then loaded into an "instruction" element and second, when calling for a data item, that is then loaded into a "data"

element, before the first loading has been deleted. Now, an information item of the opposite type to the type involved in the operation in progress can thus be loaded into the section which was not allocated to it. Now, if in case of such double loading, the value of the information block must be modified, the updating must be carried out in both sections at the same time. This leads to a more complicated system than if the buffer memory were not separated into two sections. Moreover, the fact that identical information exists in both sections of the buffer memory potentially reduces its overall capacity.

SUMMARY OF THE INVENTION

The problem presented therefore consists in reducing the miss rate by taking into account the type of information while avoiding the disadvantage related to the above replacement mode.

The solution to this problem consists in that the partitioning systems allow at least one of the said information types, therefore called a limited type, to equivocally fill at most a predetermined limited amount of memory scattered in the buffer memory, and when a current information item has to be loaded while said limited amount has been exceeded by the stored information of limited type, the replacement system load it by priority by replacing a stored replaceable information item of limited type.

Thus, advantageously, the miss rate is reduced by taking account of the type of information, and also the complexity of implementation is reduced without duplicating information. Coherence is thus attained.

Advantageously, the replacement system comprise:

a block RL (limited replacement) which controls replacement of limited-type informations when the limited amount is exceeded and when at least one limited-type information is present for the addressed current class, and a block RT (total replacement) which controls replacement of any informations in the opposite case.

Such distributive organization is a convenient implementation.

Advantageously, the buffer memory be constituted from several classes of memory elements.

Advantageously, when it is desired to reconfigure the partitioning of the information it suffices to load a new value of the limited amount, without requiring saving of the information already stored, the buffer memory then evolving, because of the replacement, towards the new partitioning. The reconfiguration of the buffer memory is thus very fast without any external intervention other than the loading of the new value of the limited amount. The buffer memory is therefore simpler to realize.

The limited amount of memory is determined by a filling value which can be updated. Thus, in the case of the execution of a program which works in conjunction with such a buffer memory, it is possible to assign dimensions to the respective sections allocated to instructions and/or to data. This value can be fixed before the execution of the program and can be loaded in the partitioning circuits which carry out this allocation. The partitioning circuits may be preprogrammed according to a series of predetermined values or determine, during the execution of the program, the values most suited to the sequences of the program.

The algorithm for the replacement of the stored information of limited type, when the limited amount has been exceeded, can be the general replacement algorithm (restricted to the memory elements of limited type) used for replacing any other information stored in the buffer memory. It can be one of the known algorithms: LRU, FIFO, Random or any other. It is possible to use a specific algorithm in the limited case. For example, by classifying the ways according to an ordered sequence of increasing indices it is possible to select rapidly the way (and therefore the memory element) in which the replacement must be carded out in limited mode by, for example, determining the lowest channel index.

According to the invention, it is possible to limit either the instructions or the data. It is also possible to fix simultaneously a value to each of the limited amounts allocated to the two types of information. It is, for example, possible to fix two percentages whose sum is less than 100%. This case corresponds to a reduced utilization of the capacity of the buffer memory.

It is preferred to fix two percentages whose sum is greater than 100%. Thus, when a type of information is temporarily less present, memory space which was available for this type of information is transferred to the other type of information. The buffer memory is thus better managed to allow simultaneously for both types of information.

BRIEF DESCRIPTION OF THE DRAWINGS

The invention will be better understood with the aid of the following Figures given by way of non-limitative examples and in which.

DESCRIPTION OF EMBODIMENTS

Figure 1:
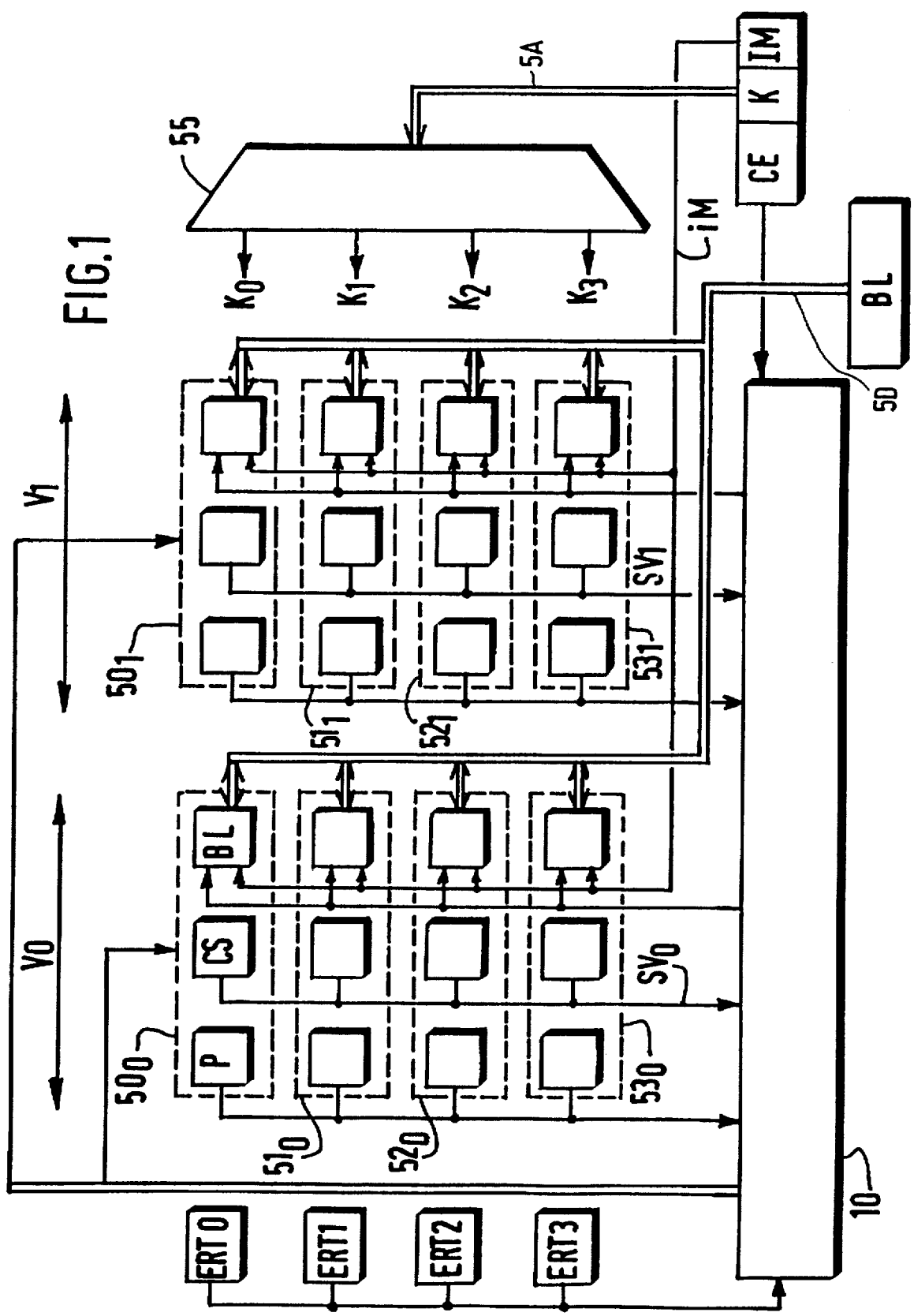
FIG. 1 is a diagram of a simplified example of the general organization of a buffer memory.

FIG. 1 shows a simplified, but not limitative, example of the essential elements of a buffer memory. It comprises two ways $V_0$, $V_1$ each including four classes $K_0$, $K_1$, $K_2$, $K_3$ of memory elements. Each class contains one memory element per way, i.e. 2 according to the example shown. Way V contains memory elements $50_0$, $51_0$, $52_0$, $53_0$. Way $V_1$ contains memory elements $50_1$, $51_1$, $52_1$, $53_1$. Class $K_0$ contains the memory elements $50_0$, $50_1$, etcetera for the other classes.

Each memory element, for example $50_0$, comprises several storage positions for:

a presence bit P, a stored tag CS, a data block BL, which contains the information of the element, such as a uniform plurality of words having consecutive addresses.

Fields ERT0, ERT1, ERT2, ERT3, respectively associated to each class $K_0$, $K_1$, $K_2$, $K_3$, allow the determination of the state of occupation of each class of memory elements according to the replacement algorithm used. These fields ERT can also be specific to each of the memory elements of the buffer memory.

Data is carried by a data bus 5D which supplies the data fields BL.

Addresses are supplied by an address bus 5A which supplies three fields:

an input address tag field CE, an input address class index field K, a word index field IM which distinguishes the words in a data field BL.

The field IM and the presence bit P may be absent. When the presence bit P does not exist, another solution is having a flag associated with each class.

The processor (not shown) cooperates with the buffer memory and supplies an address on the bus 5A. The processor may either supply or receive a data word on the bus 5D. From the address, the decoder 55 extracts the class index and selects the corresponding class. The memory elements of this class are then activated. When, for example, the class $K_0$ is selected, the memory element $50_0$ and $50_1$ are activated. The then transmit their presence bit P (if present) and their stored tag CS to the control device 10 which also receives the input tag CE of the input address. In the diagram in FIG. 1 a single control device 10 has been shown for the complete buffer memory. This has the advantage of minimizing the complexity of the hardware. It is also possible to use a respective control device for one or more classes, which has the advantage of a faster execution.

If the search for the address results in a success, the operation consists in carrying out a reading or a writing of the data BL in the memory element producing the success and in updating the associated ERT field.

If the search for the address results in a miss, the replacement consists in writing the data field BL with its tag CS and its presence bit P (if present) taking account of the ERT fields. According to the replacement algorithm effectively used, control device 10 selects the memory element due for the replacement operation.

Figure 2:
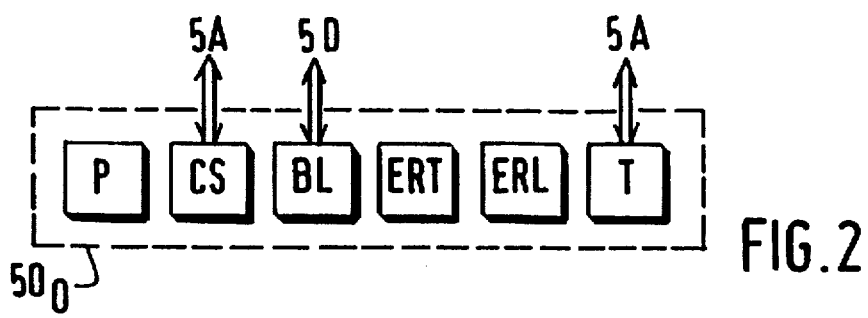
FIG. 2 is a general representation of the information fields relating to any memory element according to the invention.

According to the invention, the fields of bits relating to each memory element (for example the memory element $50_0$) are modified as illustrated in FIG. 2. The fields ERL and T are used in addition to the fields P, CS, BL and ERT. The field T is a bit which indicates whether the information stored in BL is of the instruction type or of the data type. This field T comes from the processor which supplies the information to the buffer memory. The field ERL indicates the state of occupation of the corresponding memory element during the implementation of the replacement but takes into account only the operations relating to the limited mode peculiar to the invention.

Figure 3:
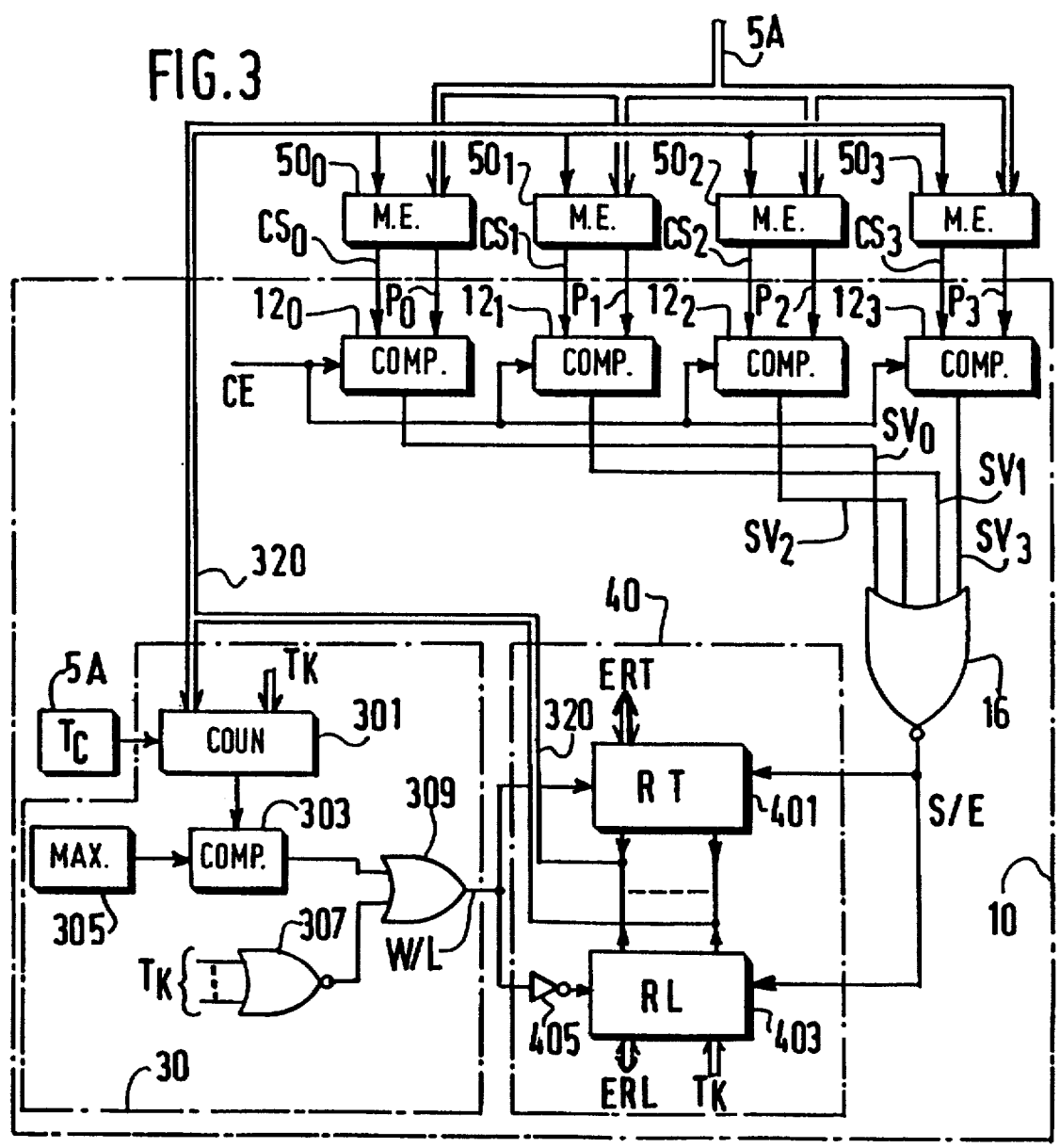
FIG. 3 is a diagram of the control device for a buffer memory according to the invention.

In the simplified example of FIG. 3, there is represented a control device 10 which is allocated to a single class $K_0$ relating to the memory elements $50_0$, $51_1$, $50_2$, $50_3$, which are addressed from bus 5A. Each memory element transmits its stored tag $CS_i$ to one of the comparators $12_0$, $12_1$, $12_2$, $12_3$, all of which receive the input address key CE and perform the comparison under the control of the respective presence bits $P_0$ to $P_3$.

In the case of a miss, all comparators have their output ($SV_0$ to $SV_3$) in the inactive state. In the case of success, one of the comparators has its output in the active state. A NOR gate 16, receiving the signals $SV_0$ to $SV_3$, allows the supply of a signal S/E which, if true, signals the miss of the address currently presented.

The control is performed with the aid of partitioning circuits 30 and replacement circuits 40. The partitioning circuits 30 comprise a counter 301 which receives from the bus 5A coming from the processor (FIG. 2) the type bit $T_C$ belonging to the current address. The counter 301 is allocated to a predetermined type of limited information.

The amount of limited type information actually contained in the buffer memory, represented by the value of the counter, is compared in a comparator 303 with a value of the limited memory amount provided for this limited type and contained in a register 305. If this maximum value had been exceeded, the comparator produces a low output signal. If this maximum value had not been exceeded, the comparator produces a high output signal. The output of comparator 303 is applied to an OR gate 309 which receives the output of a NOR gate 307 which receives all of the type bits $T_K$ of the class K which was activated by the current address. The NOR gate 307 produces a high output signal exclusively if none of the memory elements of the activated class stores information of the limited type. In all other situations it produces a low signal.

The output of OR gate 309 supplies the signal W/L which determines if the replacement must be carried out either over the totality (W) of the memory elements of the activated class or over a limited section (L) of the latter. This signal W/L is applied to the replacement circuits 40 which comprise a unit 401 for a replacement operating over the totality and a unit 403 for a replacement operating over the limited section. If signal W/L is high, it activates exclusively unit 401. If signal W/L is low, by virtue of inverter 405 it exclusively activates unit 403. Therefore, the totality of the activated class is searched either if the amount of limited information had not yet exceeded its maximum, or if none of the memory elements of the activated class contains limited information.

The unit 401 implements a conventional replacement algorithm, for example LRU, FIFO or Random, over the totality of the memory elements of the selected class. For this purpose it receives the ERT field which takes account of the mechanism implemented. For example it allows the determination of whether it is the least recently used element in the case of the LRU algorithm. The unit 401 is validated by the signal S/E which is only active in case of a failure. The unit 401 supplies the bus 320 with the address of the memory element selected for replacement. This replacement step exists either when the said limited amount has not been reached or when in the selected class none of the memory elements contains information of the limited type.

The unit 403 operates when the limited amount of memory available for the information of limited type has been exceeded and when the selected class contains at least one element of limited type. The unit 403 receives the active S/E signal when there is a failure, the ERL fields from all memory elements of the activated class and their type bit $T_K$. The ERL field signifies the order in which the replacement must be performed according to the algorithm used, and the bits $T_K$ allow the determination of those having the correct type T. The address of the selected memory element is again transmitted by the bus 320 to the memory element. It also goes to counter 301 which also receives, on the bus $T_K$, the type of the selected memory element. If the current type of this selected memory element is of limited type, and the new information is not of the limited type, the counter is then decremented by unity in order to take account of the replacement. On the other hand, the counter is incremented by unity if the bit $T_C$ of the current address indicates that it is of the limited type and the new information is not of the limited type. If old and new information are of the same type, the counter position does not change.

In FIG. 3, as in FIG. 1, synchronization of the various elements has not been shown for simplicity and better clarity.

It is thus possible to fill the buffer memory with items of the limited type up to the value of the amount which is allocated to it. In practice this amount may be temporarily slightly exceeded. In fact, in various programs, data blocks BL may contain information of both types. The type allocated to the memory element is that of the information which gave rise to the replacement. It is therefore possible to add a slight additional residual level to the maximum amount of the limited type.

When the information of limited type is not present in a sufficiently large amount, the other type of information is then automatically loaded into the buffer memory until the memory is 100% filled.

It is possible to define two values of limited amounts each relating to one of the two types of information. In order not to leave unused space in the buffer memory (unless another type of information is provided), the sum of the limited amounts should preferably be greater than 100%. A better dynamic management of the buffer memory is thus obtained.

The values of the limited amounts can easily be updated by changing the value contained in register 305 (FIG. 3). When two values must be generated, the partitioning circuits and part of the replacement circuits are duplicated. It is also possible to modify these values in the course of time.

Figure 4:
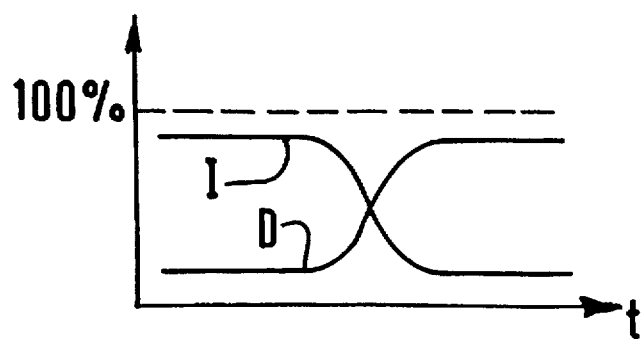
FIG. 4 is a representation of the evolution of the respective percentages of instructions and data in the execution of a program as a function of time.

FIG. 4 shows an example of evolution in time of the types of information formed by instructions I and by data D. It is possible that at the beginning of the execution of a program by a processor the rate of the instructions I is high while the rate of the data D is low. The relative proportions can vary and subsequently be reversed. The renewal of the values of limited amounts can be performed. This can be done by introducing into the buffer memory either from outside sequences of predetermined values or from within values dynamically programmed in association with the program executed by the processor.

Figure 5:
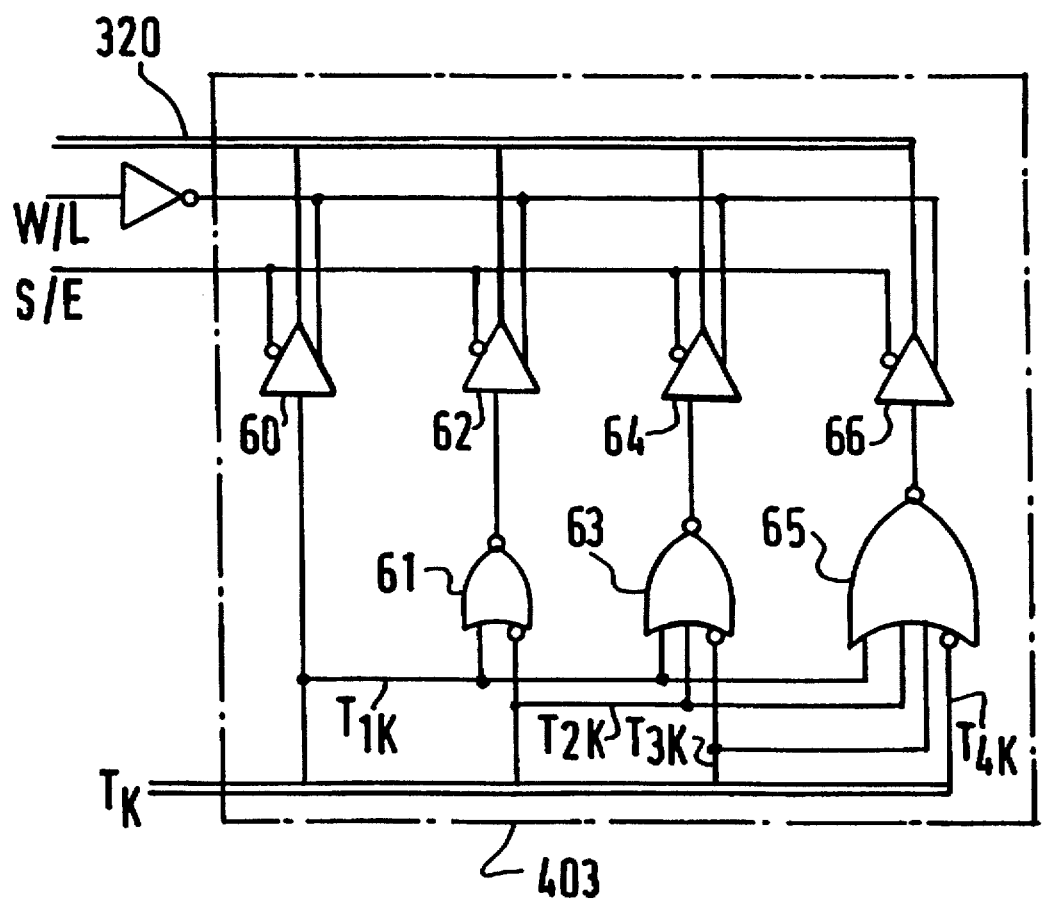
FIG. 5 shows a channel selection mode which can be used for the replacement of information of limited type in a simplified embodiment.

FIG. 5 shows a simplified embodiment of the unit 403 in the case of a specific operational algorithm operating on information of limited type for an example limited to 4 memory elements. In this case the replacement order is specific to the structure of this unit and the ERL fields do not exist explicitly. For this example with 4 memory elements, the unit 403 receives, for the activated class K, the type bits $T_{1K}, T_{2K}, T_{3K}$ and $T_{4K}$. A first NOR gate 61 receives $T_{1K}$ and $T_{2K}$ inverted. A second NOR gate 63 receives $T_{1K}, T_{2K}$, and $T_{3K}$ inverted. A third NOR gate 65 receives $T_{1K}, T_{2K}, T_{3K}$ and $T_{4K}$ inverted.

Four output stages 60, 62, 64, 66 each having three states respectively receive:

$T_{1K}$ the output of the NOR gate 61 the output of the NOR gate 63 the output of the NOR gate 65

When the W/L signal is active (limited mode) and the signal S/E is active (miss), the four output stages allow the signals present on their respective inputs to pass through. They are in a high impedance state in the opposite cases. This circuit allows the selection of the first selectable memory element in the series of elements which are ordered according to the embodiment of the circuit.

It is thus possible to order the memory elements according to such a sequence ordered in such a manner as to implement the replacement.

Figure 6:
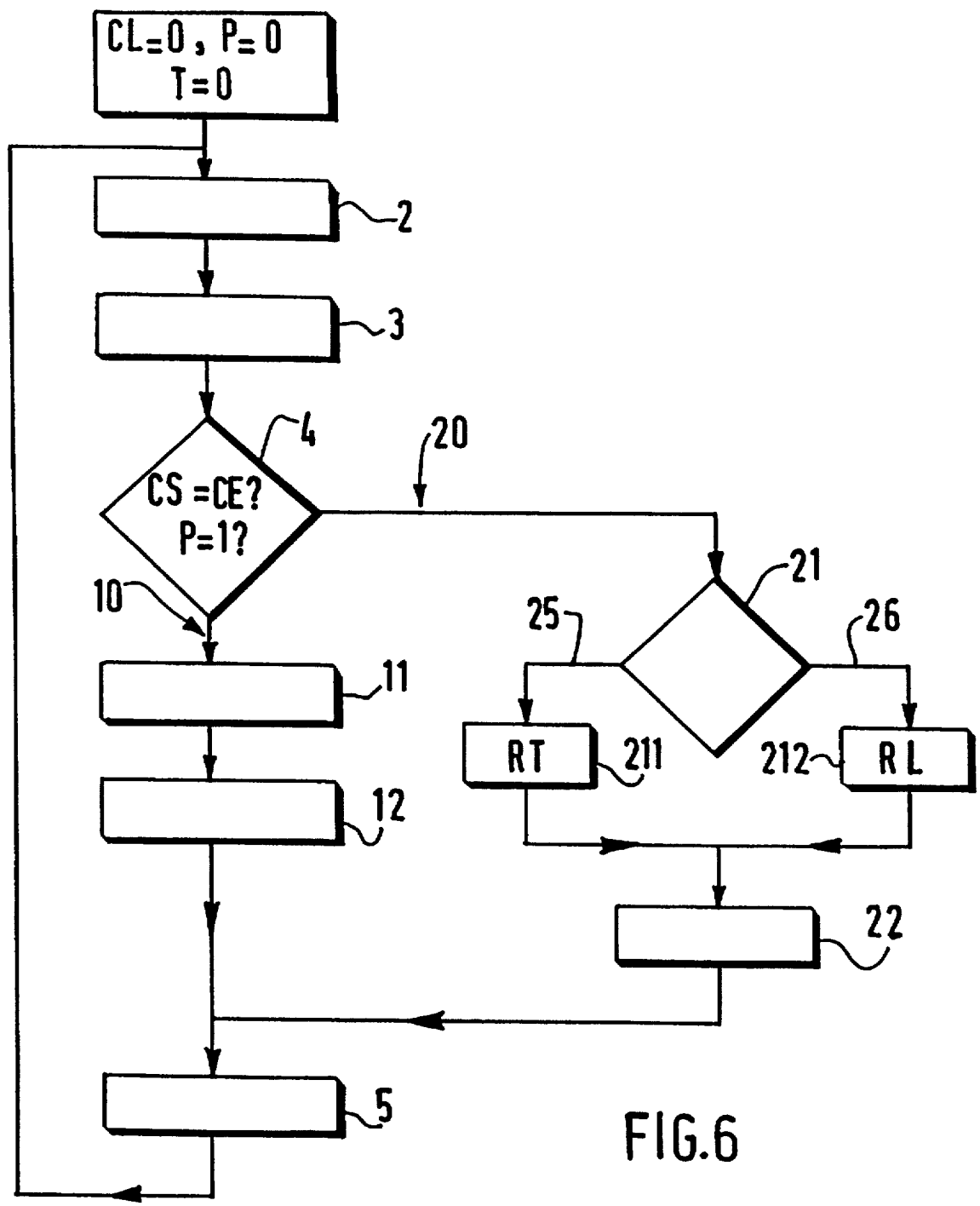
FIG. 6 shows different steps in the management method of the buffer memory implemented in the invention.

The information management method used in the buffer memory is represented by the flowchart in FIG. 6.

Step 1: initialization: the value CL of the counter 301 is set to zero; a value of the limited amount is stored; for each element, its presence bit P is set to the unoccupied state (0 for example) and its type bit T is set to the unlimited state (0 for example).

Step 2: entry of the input address.

Step 3: selection of the class and determination of the input address tag.

Step 4: search for a success for this address: comparison for the elements of the class, of their stored stages CS, and of the tag CE of the current address and testing of the present bit P.

- if there is success (branch 10), selection (step 11) of the memory element which satisfies the conditions for success, then reading or writing (step 12) of the data as required, then updating of the state of the buffer memory in the replacement devices.

- if there is miss over all of the elements of the class, it is necessary to carry out a replacement procedure (branch 20).

Step 21: comparison of the value contained in the counter with the value of the limited amount and testing of the type of the memory elements of the class selected by the current address. When the counter is below the basic value of the limited amount or when no memory element is of the limited type, the replacement mode is determined by the basic replacement algorithm RT (branch 25) (step 211).

When the counter is above the value of the limited amount and when there is at least one memory element of limited type which can be selected, the replacement mode is determined by the replacement algorithm peculiar to the limited mode RL (branch 26) (step 212).

After the action of one or other of the replacement algorithms, various updating operations are necessary (counter, type bit . . . ) (step 22).

Step 5 represents a step of modifying the value or values of limited amount of memory (if required). The latter can be entered either individually, or in sequences, or can be programmed.

It is possible for the partitioning system and/or the replacement system to be programmed. In the most general case a central processing unit, with the aid of software, determines the current amount of information of limited type, and then compares it with the limited amount of memory provided for this limited type. The current amount of information of limited type is written in a memory location (of the buffer memory or others). The software also carries out the detection of the presence of memory elements of limited type in the selected class.

The performance obtained by the invention for the failure rates have been determined, for a buffer memory of overall capacity 256 bytes for which each memory element comprises 4 words each having 4 bytes. The LRU replacement algorithm was used as the basic algorithm for carrying out the replacement according to the general overall mode. The replacement algorithm carrying out the determination of the smallest channel index (as already explained) was used for carrying out the replacement according to the limited mode. The results are given in table I for which the value QL of the limited amount is expressed as a fraction of the overall capacity of the buffer memory. The results are also expressed as a function of the number of elements E per class.

The application of the LRU basic algorithm used without application of the invention is equivalent to reading the results of the column for a value QL of the limited amount equal to $^{16}/_{16}$. For the other columns, QL varies from $^{9}/_{16}$ to $^{15}/_{16}$. For a certain value of the limited amount the results are optimum. These optimum results are shown in Table II, as are the failure rates obtained using LRU. It is observed that when the number E of memory elements per class increases, the improvement contributed by the invention becomes significant, the failure rate being more than twice as low when E=16 for example.

TABLE I

| | FAILURE RATE (%) | | | | | | | |
|---|---|---|---|---|---|---|---|---|
| QL E | 0/16 | 1/16 | 2/16 | 3/16 | 4/16 | 5/16 | 6/16 | 7/16 |
| 2 | 16,29 | 16,29 | 16,29 | 16,29 | 16,27 | 16,13 | 14,61 | 13,06 |
| 4 | 18,92 | 18,92 | 18,92 | 16,87 | 15,12 | 12,73 | 10,66 | 9,42 |
| 8 | 20,72 | 19,80 | 17,50 | 15,62 | 14,29 | 12,89 | 10,16 | 8,76 |
| 16 | 20,73 | 18,77 | 16,83 | 15,83 | 14,25 | 12,96 | 9,08 | 7,40 |
| QL E | 8/16 | 9/16 | 10/16 | 11/16 | 12/16 | 13/16 | 14/16 | 15/16 | 16/16 |
| 2 | 11,69 | 10,42 | 10,44 | 10,80 | 11,51 | 11,61 | 11,69 | 11,69 | 11,69 |
| 4 | 8,29 | 7,08 | 5,53 | 4,17 | 4,74 | 5,19 | 5,21 | 5,20 | 5,20 |
| 8 | 7,31 | 6,07 | 5,04 | 3,61 | 3,79 | 6,30 | 6,28 | 6,26 | 6,26 |
| 16 | 6,14 | 5,03 | 4,07 | 3,19 | 3,43 | 6,76 | 6,73 | 6,72 | 6,72 |

| E | invention | LRU |
|---|---|---|
| 2 | 10.42 | 11.69 |
| 4 | 4.17 | 5.20 |
| 8 | 3.61 | 6.26 |
| 16 | 3.19 | 6.72 |

I claim:

1. Control device for a buffer memory for storing information comprising: reconfigurable partitioning means for distinguishing two types of information, an "instruction" type and a "data type"; and replacement means which replace stored information with current information according to at least one replacement algorithm, in which the partitioning means control at least one of the information types, therefore called a controlled type of information; a memory for storing a value corresponding to a predetermined reference amount of memory greater than zero scattered in the buffer memory, allocated to the controlled type of information, the control means including means for storing a value corresponding to the amount of controlled type information previously stored, and comparing the amount of information of the controlled type previously stored in the memory with the predetermined reference amount, prior to storing current information and if it exceeds the predetermined reference amount, when a current information item has to be loaded while said reference amount of memory has been exceeded by the stored information of controlled type, the replacement means load it by priority by replacing a stored replaceable information item of controlled type of information.

2. Control device according to claim 1 in which the replacement means comprises:
means for controlling replacement of the controlled type of information when the reference amount is exceeded and when at least one controlled-type of information is present in the current information item,
and means for controlling replacement of any information when the reference amount is not exceeded or when no controlled type of information is present.

3. Control device according to claim 1, in which the replacement means comprises means for replacement of the stored information of controlled type according to a specific replacement algorithm.

4. Control device according to claim 1 comprising means for updating the stored predetermined reference amount of memory in the partitioning means.

5. Control device according to claim 1, comprising means for loading at least one value of said reference amount of memory in the partitioning means.

6. Control device according to claim 1 in which the partitioning means comprises means programmed to determine the amount of the limited amount of memory.

7. Control device according to claim 1 in which the sum of the amounts of the reference amounts of memory allocated to the two types of information is greater than 100% of the memory.

8. Control device according to claim 1 in which in the case where the reference amount has been exceeded, the replacement of an information item of controlled type is carried out by choosing a selectable memory element having a first channel index in an ordered sequence of channel indices.

9. Control device according to claim 1 in which the partitioning means (30) and/or the replacement means (40) are programmed means.

10. A data processing system having processing means, secondary storage means, and a buffer interposed between said processing means and said secondary storage means, and having a control device as claimed in claim 1.

* * * * *